United States Patent
Liu et al.

(10) Patent No.: US 8,364,420 B2
(45) Date of Patent: Jan. 29, 2013

(54) COMBUSTION TEMPERATURE ESTIMATION SYSTEM AND METHOD FOR AN ENGINE MANAGEMENT SYSTEM

(75) Inventors: Zhiping Steven Liu, Canton, MI (US); Daniele Ceccarini, Bologna (IT); Anupam Gangopadhyay, Chennai (IN); Andrea Baccile, Cascina (IT); Peter Fussey, Hove (GB)

(73) Assignee: GM Global Technology Operations LLC

( * ) Notice: Subject to any disclaimer, the term of this patent is extended or adjusted under 35 U.S.C. 154(b) by 698 days.

(21) Appl. No.: 12/564,375

(22) Filed: Sep. 22, 2009

(65) Prior Publication Data

US 2010/0223014 A1    Sep. 2, 2010

Related U.S. Application Data

(60) Provisional application No. 61/156,649, filed on Mar. 2, 2009.

(51) Int. Cl.
*G01N 31/00* (2006.01)
(52) U.S. Cl. .......................................................... 702/24
(58) Field of Classification Search ..................... 702/24
See application file for complete search history.

(56) References Cited

U.S. PATENT DOCUMENTS

| | | | | |
|---|---|---|---|---|
| 6,505,465 | B2 * | 1/2003 | Kanazawa et al. | 60/278 |
| 6,845,753 | B2 * | 1/2005 | Kotwicki | 123/406.26 |

* cited by examiner

*Primary Examiner* — Stephen Cherry

(57) ABSTRACT

A flame temperature estimator includes an adiabatic flame temperature module that estimates an adiabatic flame temperature. A temperature reduction module estimates a temperature reduction for the adiabatic flame temperature based on an air-to-fuel ratio of an engine. A combustion temperature trend module generates a combustion temperature trend based on the temperature reduction and the adiabatic flame temperature.

17 Claims, 7 Drawing Sheets

COMBUSTION TEMPERATURE ESTIMATION SYSTEM AND METHOD FOR AN ENGINE MANAGEMENT SYSTEM

CROSS-REFERENCE TO RELATED APPLICATIONS

This application claims the benefit of U.S. Provisional Application No. 61/156,649, filed on Mar. 2, 2009. The disclosure of the above application is incorporated herein by reference in its entirety.

FIELD

The present disclosure relates to engine management systems, and more particularly to combustion temperature estimation systems and methods for engine management systems that estimate engine-out nitrogen oxide (NOx) levels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine management systems may need to generate an engine-out NOx estimate or measurement for after-treatment control systems. For example only, the after-treatment control systems may use the NOx estimate or measurement for lean NOx trap (LNT) fill estimation, reductant metering strategies in selective catalyst reduction (SCR), etc.

Some engine management systems use a NOx sensor arranged in an exhaust stream to directly measure the NOx level. However, the NOx sensor is expensive and tends to fail over the life of a vehicle, which may increase warranty costs. Other engine management systems generate the NOx estimate using a model instead of directly measuring the NOx level using the NOx sensor. For example only, the model may use a map or table that outputs the NOx estimate based on engine speed, load and/or other variables. While this approach is less expensive, it tends to be less accurate than engine management systems that directly measure the NOx level using the NOx sensor.

SUMMARY

A flame temperature estimator includes an adiabatic flame temperature module that estimates an adiabatic flame temperature. A temperature reduction module estimates a temperature reduction for the adiabatic flame temperature based on an air-to-fuel ratio of an engine. A combustion temperature trend module generates a combustion temperature trend based on the temperature reduction and the adiabatic flame temperature.

In other features, the adiabatic flame temperature module estimates the adiabatic flame temperature based on combustion chamber pressure and a bulk temperature. The combustion temperature trend module calculates the combustion temperature trend using a polytropic transform. The combustion temperature trend module calculates the combustion temperature trend.

In yet other features, the combustion temperature trend module calculates the combustion temperature trend further based on:

$$T_{comb\_tmp}(k) = T_{comb\_tmp}(k-1) k_{filt1} * (T_{bulk}(k) - T_{comb\_tmp}(k-1)); \text{ and}$$

$$T_{comb}(k) = T_{comb}(k-1) + k_{filt2} * (T_{bulk\_tmp}(k) - T_{comb}(k-1))$$

where $k_{filt1}$ and $k_{filt2}$ are filter constants, $T_{comb\_tmp}(k_0)$ is an Adiabatic flame temperature at combustion time $k_0$, and $T_{comb}(k_0) = T_{bulk}(k_0)$ at combustion time $k_0$.

In other features, a calibration module calibrates a relationship between the temperature reduction and the air-to-fuel ratio. The air-to-fuel ratio comprises a ratio of a current air-to-fuel ratio divided by a stoichiometric air-to-fuel ratio. The NOx estimation system calculates a NOx estimate based on at least one the adiabatic flame temperature, the temperature reduction, and the combustion temperature trend. The NOx estimate is generated independent of direct measurement of engine-out NOx levels.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
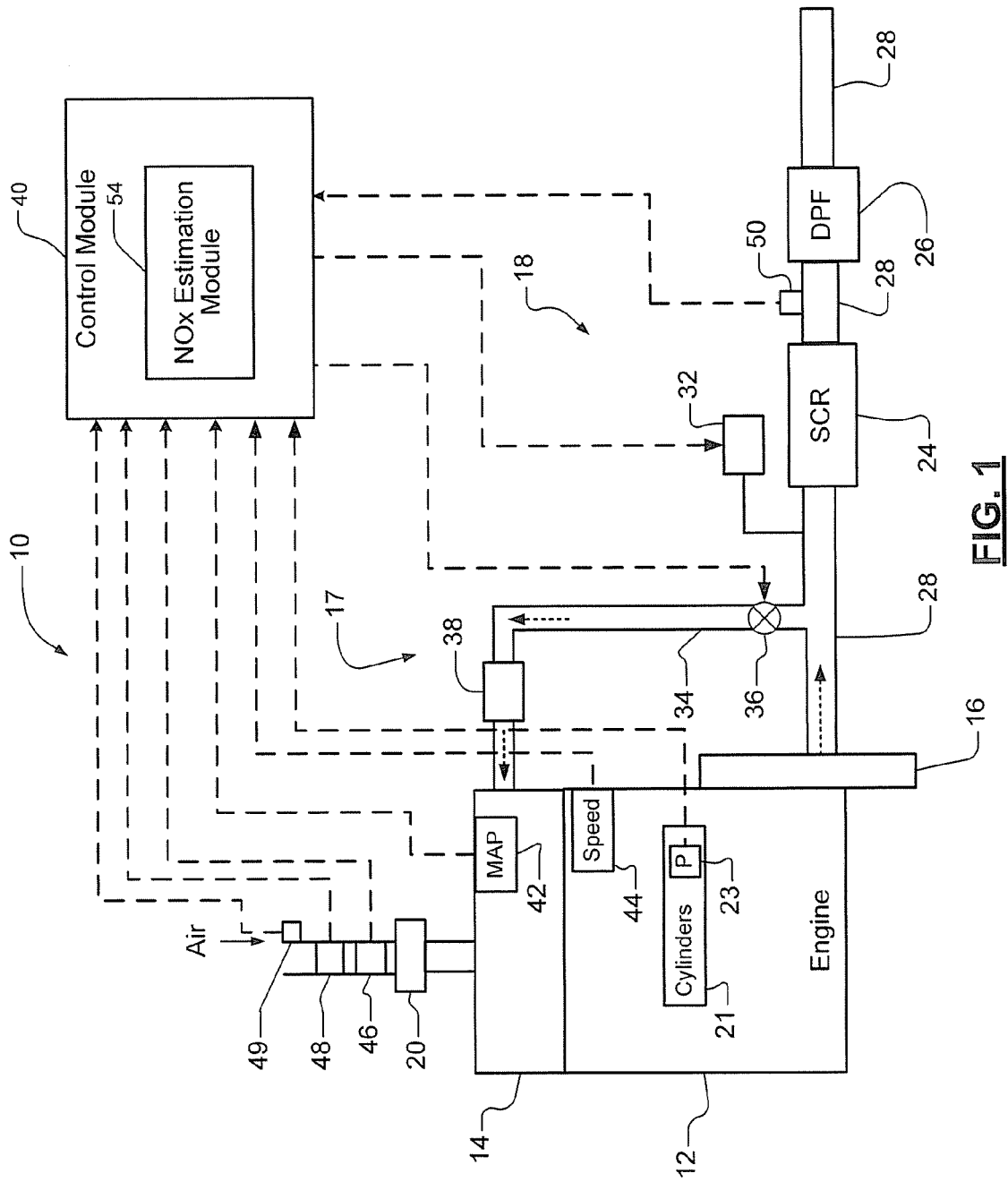
FIG. 1 is a functional block diagram of an exemplary engine management system including a NOx estimation module.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system is shown. While a diesel engine system 10 is shown, the teachings of the present disclosure can be applied to other types of engines. The diesel engine system 10 includes a diesel engine 12, an intake manifold 14, an exhaust manifold 16, an exhaust gas recirculation (EGR) system 17, and an exhaust system 18.

Air is drawn through a throttle 20 into the intake manifold 14 and is distributed to cylinders 21. Fuel is injected into the cylinders by a common rail injection system (not shown). The air is compressed in the cylinders 21 and heat of the compressed air ignites the air/fuel mixture. The combustion of the air/fuel mixture generates combustion force to drive pistons (not shown) in the cylinders 21. The pistons rotatably drive a crankshaft (not shown). The exhaust gas exits from the cylinders 21 through the exhaust manifold 16 and into the exhaust system 18. Pressure sensors 23 may be used to monitor pressure in a combustion chamber of each of the cylinders 21, respectively.

The exhaust system 18 includes a selective catalytic reduction (SCR) unit 24 and a diesel particulate filter (DPF) 26. The SCR unit 24 communicates with the exhaust manifold 16 through an exhaust pipe 28.

The SCR unit 24 removes NOx from the exhaust gas through an SCR process. A dosing system 32 injects a reductant (such as, for example only, urea) into the exhaust gas upstream from the SCR unit 24. The amount of the reductant to be injected for an effective SCR process depends on concentration of NOx emissions in the exhaust gas.

The DPF 26 is provided downstream from the SCR unit 24 to remove diesel particulate matter and/or soot from the exhaust gas. While the DPF 26 is arranged downstream from the SCR unit 24, the arrangement of the SCR unit 24 and the DPF 26 can be reversed.

The EGR system 17 includes an EGR conduit 34 that communicates with the exhaust pipe 28, an EGR valve 36, and an EGR cooler 38. The EGR valve 36 controls the amount of exhaust gas that is re-circulated to the intake manifold 14. The EGR cooler 38 may be used to cool the re-circulated exhaust gas.

When the exhaust gas leaves the exhaust manifold 16, a portion of the exhaust gas is routed through the EGR valve 36 to the intake manifold 14. The remaining portion of the exhaust gas is directed to the SCR unit 24 and the DPF 26. The re-circulated exhaust gas is mixed in the intake manifold 14 with air introduced by the throttle 20. The amount of the intake air is controlled by EGR flow rate, boost level, and/or the intake throttle 20. The amount of re-circulated exhaust gas is controlled by the EGR valve 28.

A control module 40 communicates with a plurality of sensors and monitors and controls engine operation. The sensors include, but are not limited to, an intake manifold absolute pressure (MAP) sensor 42, an engine speed sensor 44, a mass air flow (MAF) sensor 46, an intake air temperature (IAT) sensor 48, and a barometric pressure sensor 49. In some implementations, during calibration of preproduction vehicles, a NOx sensor 50 may be provided in the exhaust to measure engine-out NOx.

The MAP sensor 42 measures intake manifold pressure. The engine speed sensor 44 measures engine speed (RPM). The MAF sensor 46 measures MAF through the intake manifold 14. The IAT sensor 48 measures IAT. The barometric pressure sensor 49 measures the barometric pressure. During calibration of the pre-production vehicle, the NOx sensor 50 measures SCR downstream NOx in the exhaust gas. During normal operation, the control module 40 includes a NOx estimation module 54 that estimates engine-out NOx based on a plurality of sensed and/or calculated engine parameters and without using a dedicated NOx sensor.

Figure 2:
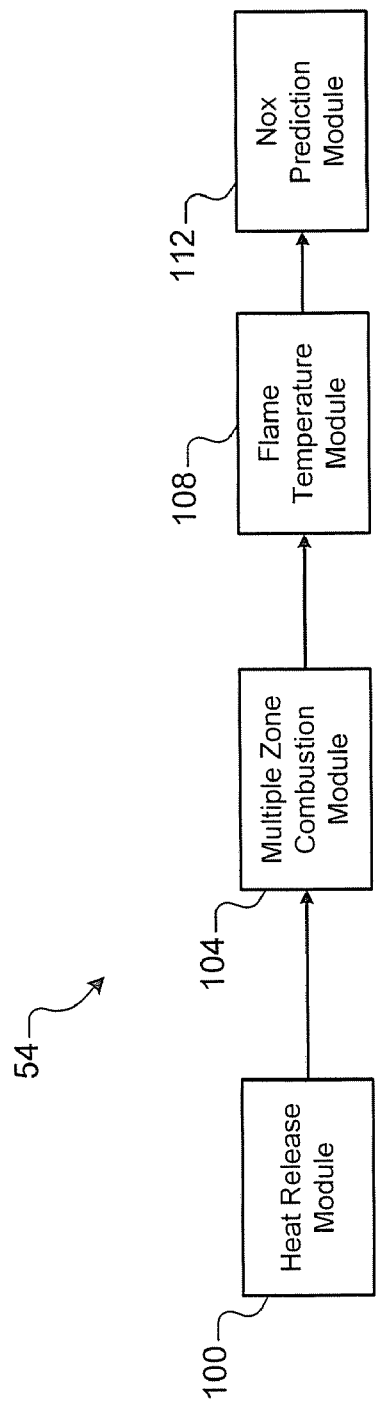
FIG. 2 is a functional block diagram of an exemplary NOx estimation module in more detail.
Figure 3:
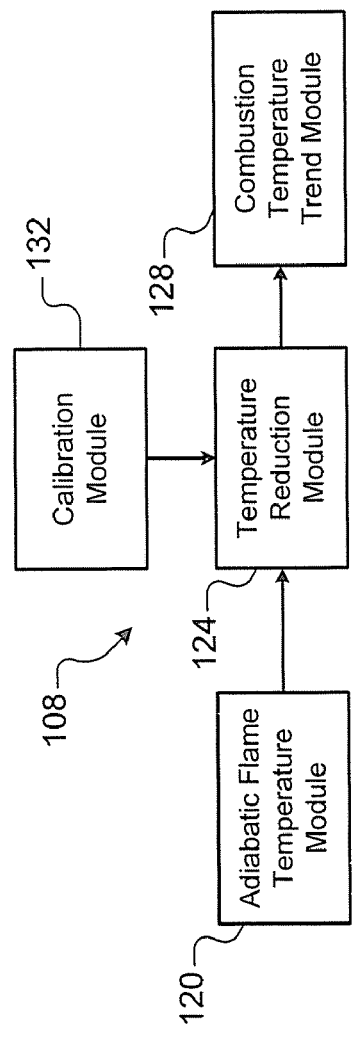
FIG. 3 is a functional block diagram of a flame temperature module of the NOx estimation module.
Figure 4:
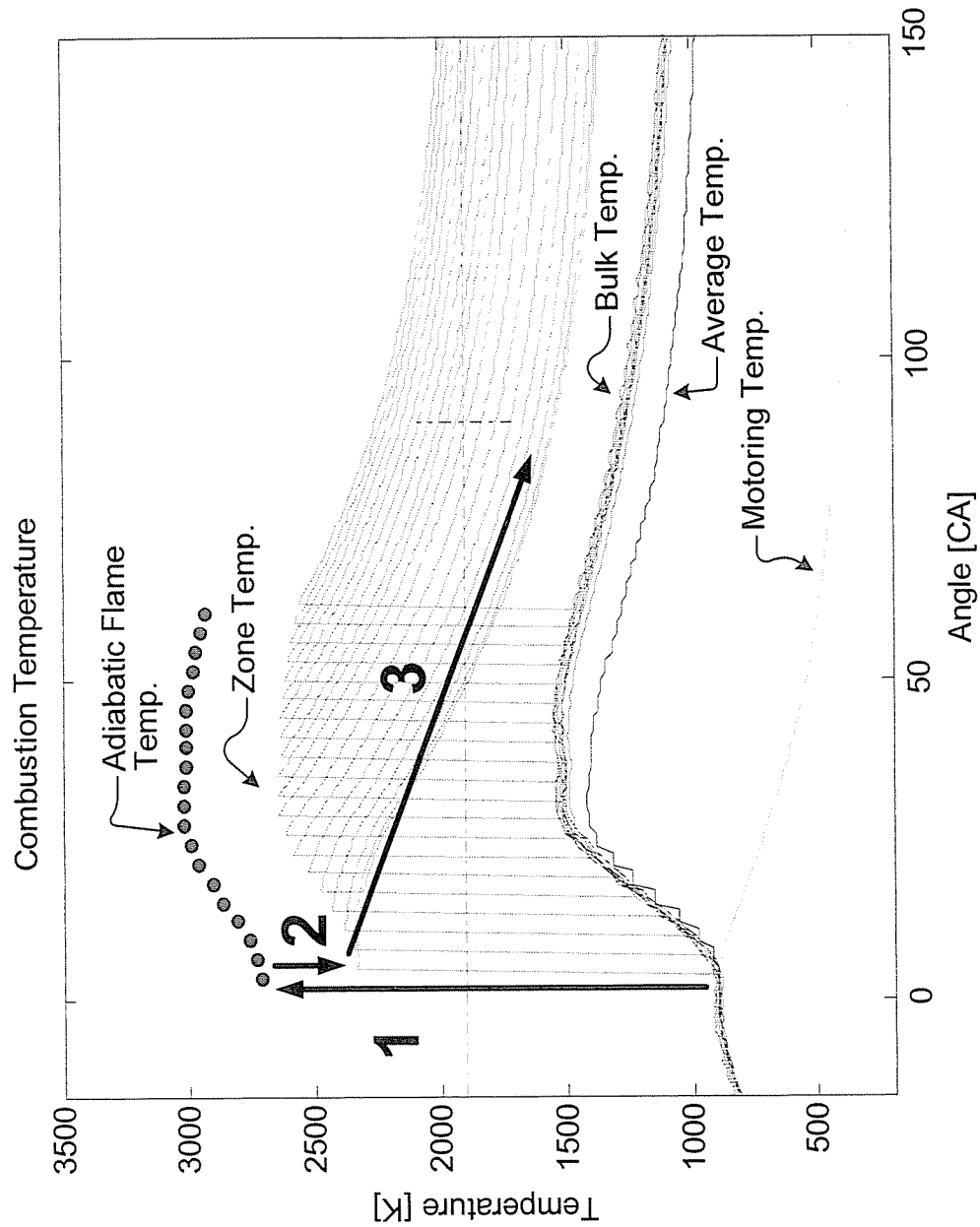
FIG. 4 is a graph illustrating combustion temperature as a function of angle.

Referring now to FIGS. 2-4, the NOx estimation module 54 is shown to include a heat release module 100, a multiple zone combustion module 104, a flame temperature module 108, and a NOx prediction module 112. The NOx estimation module 54 divides a combustion chamber in zones, calculates a temperature in each zone, and then estimates NOx in each zone.

For each combustion zone, a theoretical adiabatic flame temperature is calculated by the flame temperature module 108. In a first step (labeled step 1 in FIG. 4), the flame temperature module 108 uses thermodynamic tables indexed by combustion chamber pressure and bulk temperature to estimate the adiabatic flame temperature. In a second step (labeled step 2 in FIG. 4), a temperature reduction (or $\Delta T$) is calculated in order to have a more realistic combustion temperature. In a third step (labeled step 3 in FIG. 4), a combustion temperature development trend is calculated using a polytropic relationship or is approximated using cascaded filters.

In FIG. 3, the flame temperature module 108 includes an adiabatic flame temperature module 120, a temperature reduction module 124 and a combustion temperature trend module 128. The adiabatic flame temperature module 120 estimates an adiabatic flame temperature as described herein. The temperature reduction module 124 calculates a temperature reduction as described herein. The combustion temperature trend module 128 calculates a combustion temperature trend as described herein. A calibration module 132 may be used to calibrate a relationship between the temperature reduction and the air-to-fuel ratio or lambda $\lambda$.

Figure 5:
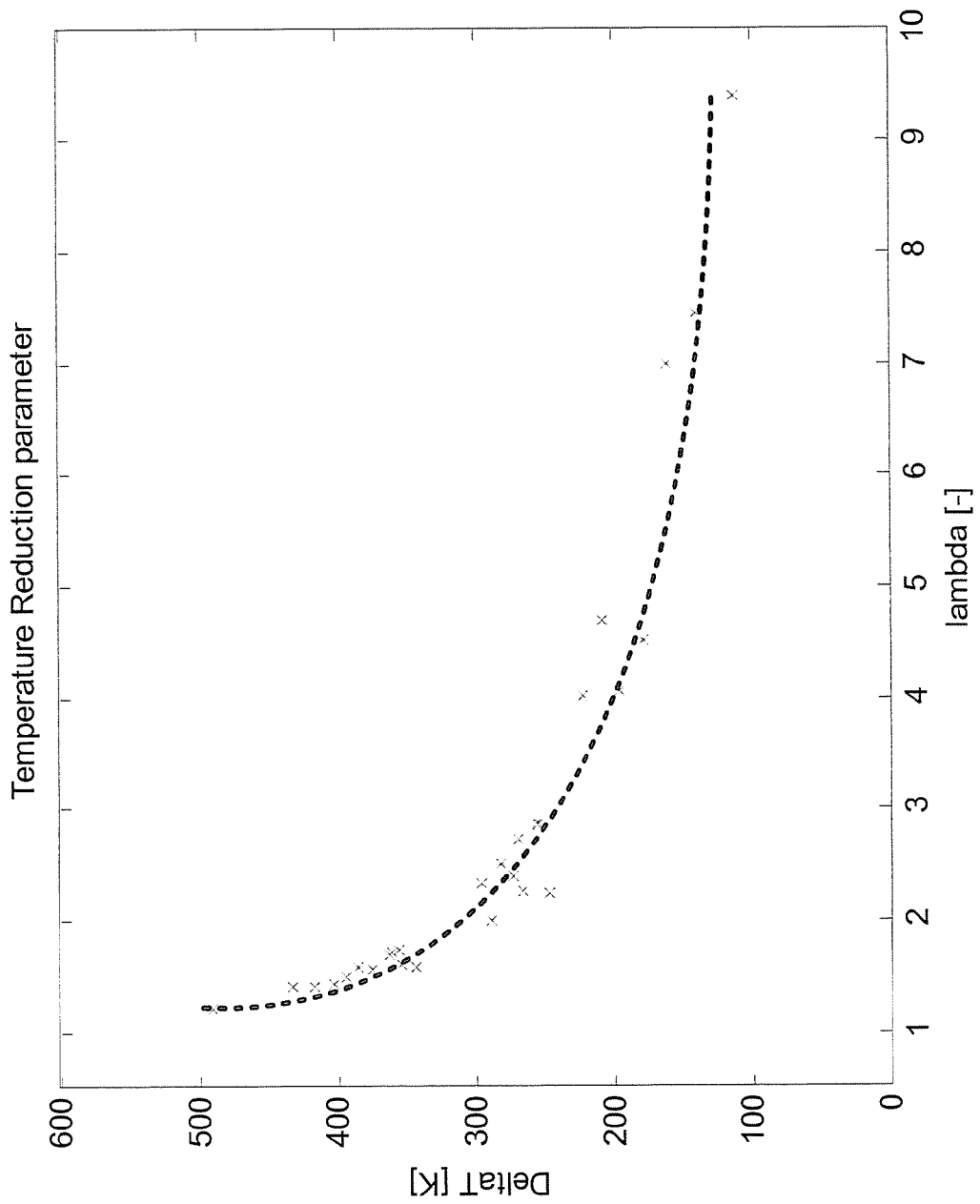
FIG. 5 is a graph of combustion temperature reduction ($\Delta T$) as a function of lambda ($\lambda$)

Referring now to FIG. 5, the temperature reduction $\Delta T$ is calculated based on the air/fuel ratio (or lambda $\lambda$). Lambda $\lambda$ is a ratio of a current air/fuel ratio to stoichiometry. For example, a table may be used. Alternately, other calibration techniques, equations and/or physical models based on lambda $\lambda$ may be used. Calibration of the table may be performed by minimizing the final model estimation error, i.e. the error between estimated NOx and measured NOx. Experimentally, the temperature reduction tends to have a shape similar to that shown in the FIG. 5.

The only engine-specific calibration of the engine-out NOx model according to the present disclosure is related to the temperature reduction as a function of $\lambda$. Once calibrated, the table, model or relationship may also be valid for different kinds of engines. The table may be calibrated using an offline calibration approach. The temperature reduction table may also be calibrated using an online approach. The online calibration approach involves using a fleet of vehicles for development, installing an instrumentation sensor that measures engine-out NOx and enabling calibration.

Online calibration may also be performed during normal vehicle use (i.e. in production) by enabling the calibration feature periodically when operating conditions enable an after-treatment downstream sensor to measure engine emissions. For example only, this may occur when an LNT is operating in low trapping efficiency conditions, or when an SCR is operating without reductants.

Figure 6:
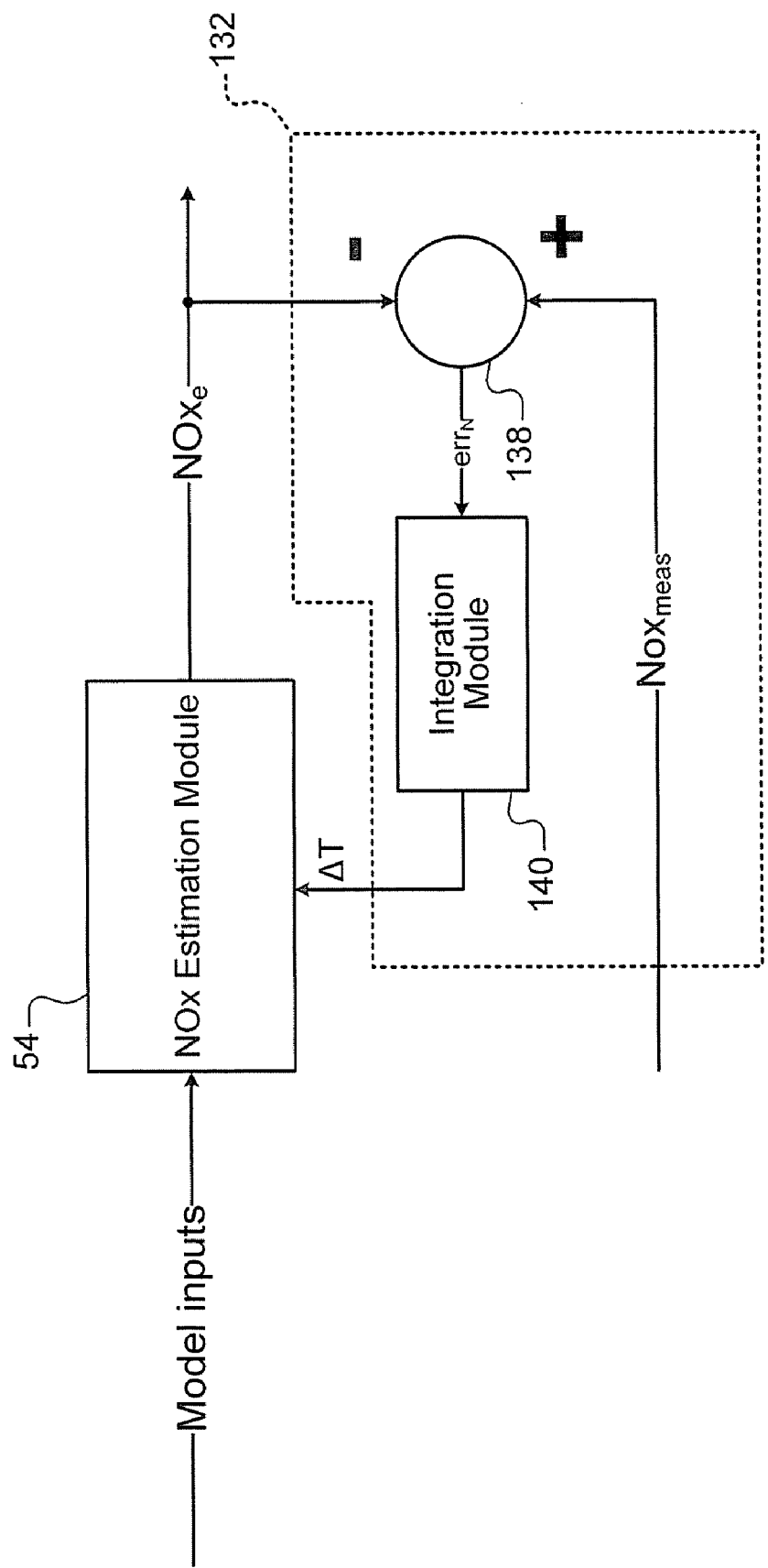
FIG. 6 is a functional block diagram illustrating calibration of a temperature reduction (or $\Delta T$) for the NOx estimation module.

Referring now to FIG. 6, the online calibration method is based on the calculation of the NOx estimation error, and the successive calculation of a correction factor to be applied to the temperature reduction. The correction factor or temperature reduction $\Delta T$ may include an integral term in order to ensure convergence of the method during short steady state conditions.

For example only, the NOx estimation module 54 receives model inputs and generates a NOx estimate ($NOx_e$). A summing module 132 generates a difference $err_N$ between a measured NOx signal ($NOx_{meas}$) and the NOx estimate $NOx_e$. An integration module 140 applies an integral term to the difference $err_N$ to generate the correction factor or temperature reduction ΔT. The NOx estimation module 54 receives model inputs and generates the NOx estimate ($NOx_e$) further based on the correction factor or temperature reduction ΔT.

Referring back to FIG. 3, the combustion temperature trend module 128 generates a combustion temperature trend. Another approach according to the present disclosure is related to step (3) (or both steps (2) and (3) together). The combustion temperature trend module 128 may use a polytropic transform to predict the behavior of temperature during the combustion. However, the polytropic transform tends to have a high computation load.

Figure 7:
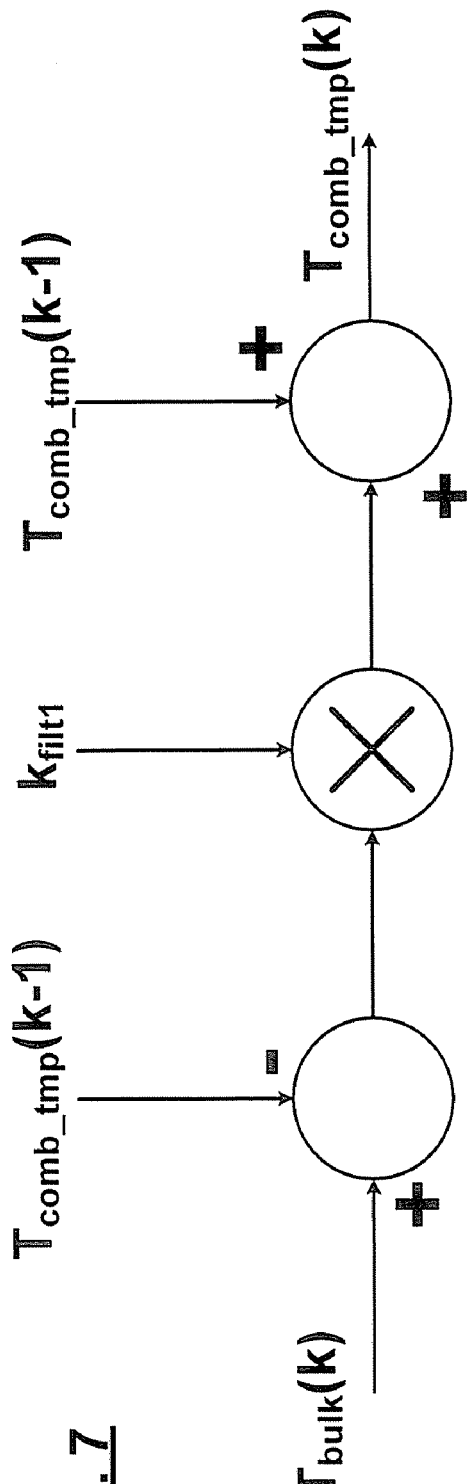
FIGS. 7 and 8 illustrate calculation of a combustion temperature development trend using cascaded filters.
Figure 8:
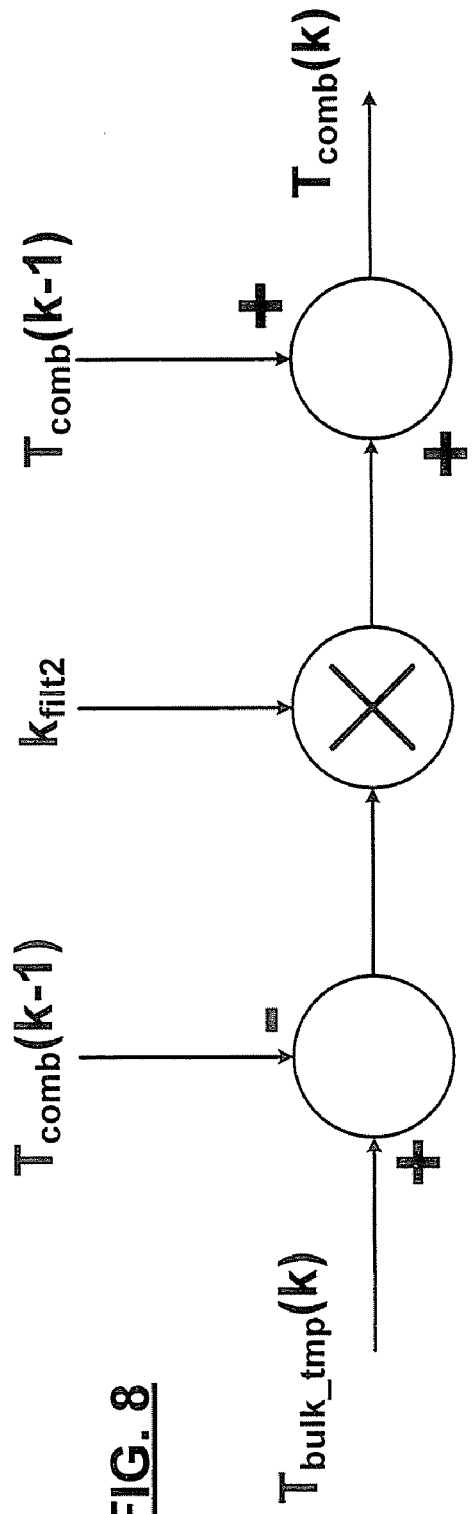

Referring now to FIGS. 7 and 8, instead of using the polytropic transform, the combustion temperature trend module 128 may use a cascade of two low-pass filters. This approach reduces the computational load with little accuracy loss. More particularly, at combustion time $k_0$:

$$T_{comb\_tmp}(k_0) = \text{Adiabatic flame temperature}$$

$$T_{comb}(k_0) = T_{bulk}(k_0)$$

For the next calculation time k:

$$T_{comb\_tmp}(k) = T_{comb\_tmp}(k-1) + k_{filt1}*(T_{bulk}(k) - T_{comb\_tmp}(k-1))$$

$$T_{comb}(k) = T_{comb}(k-1) + k_{filt2}*(T_{bulk\_tmp}(k) - T_{comb}(k-1))$$

where $k_{filt1}$ and $k_{filt2}$ are filter constants.

The NOx estimation system 54 according to the present disclosure is robust to sensor aging and changes in engine calibration. Another advantage is a relatively easy calibration procedure. Other conventional approaches tend to have several calibration parameters, for example one calibration parameter for each engine operating point, which is difficult and costly to implement.

The automatic calibration procedure can be embedded in the estimation model to enable calibration of the model directly on the production vehicle during the initial development phase or during use by customers.

Figure 9:
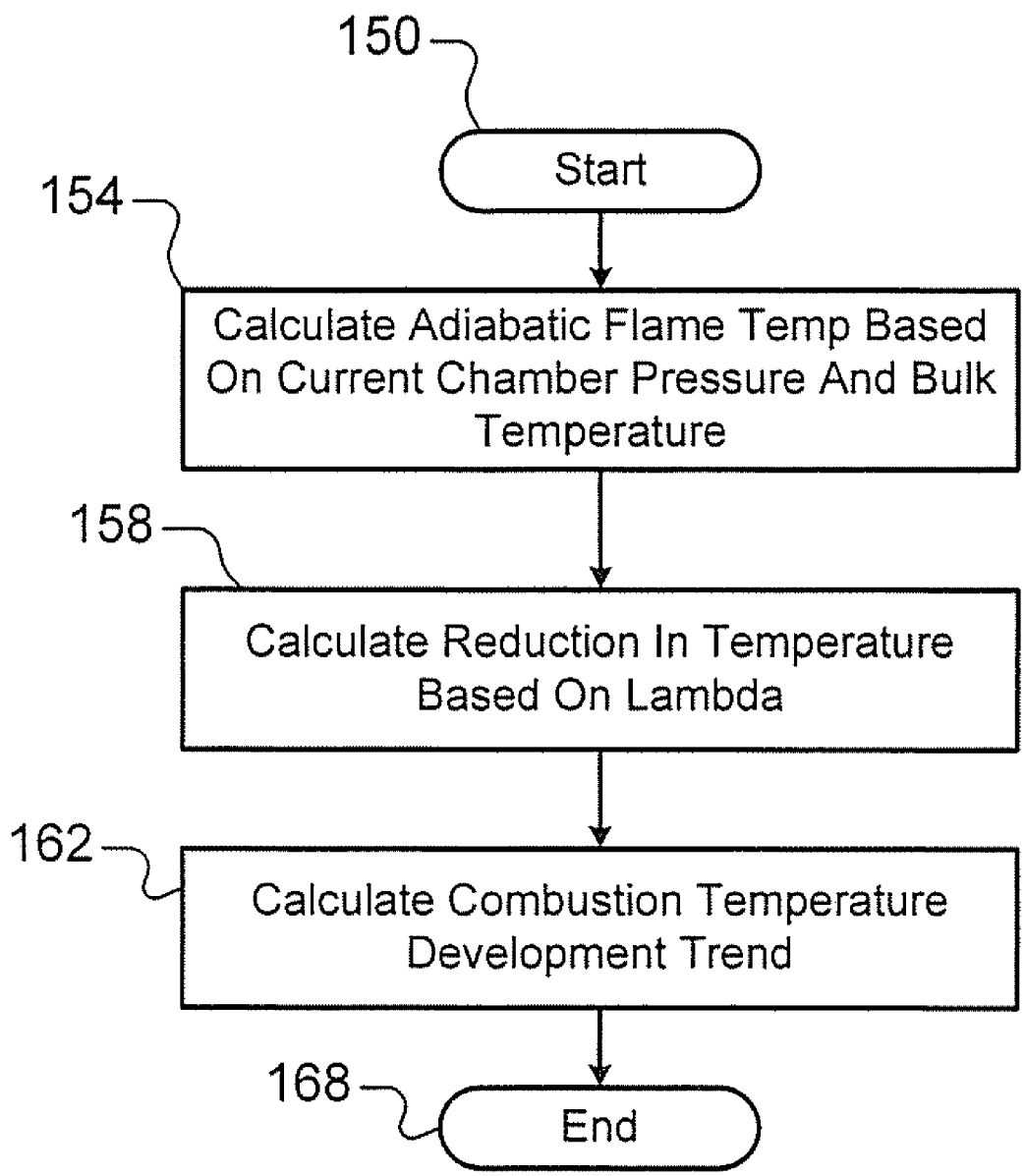
FIG. 9 illustrates steps of a method for generating the NOx estimate.

Referring now to FIG. 9, steps of a method performed by the NOx estimation system are shown. Control begins with step 150. In step 154, the adiabatic flame temperature is calculated based on combustion chamber pressure and bulk temperature. In step 158, a temperature reduction ΔT is calculated based on lambda λ. In step 162, the combustion temperature development trend may be calculated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A flame temperature estimator, comprising:
   an adiabatic flame temperature module that estimates an adiabatic flame temperature;
   a temperature reduction module that estimates a temperature reduction for the adiabatic flame temperature based on an air-to-fuel ratio of an engine; and
   a combustion temperature trend module that generates a combustion temperature trend with respect to a crank angle of the engine based on the temperature reduction and the adiabatic flame temperature.

2. The flame temperature estimator of claim 1 wherein the adiabatic flame temperature module estimates the adiabatic flame temperature based on combustion chamber pressure and a bulk temperature.

3. The flame temperature estimator of claim 1 wherein the combustion temperature trend module calculates the combustion temperature trend using a polytropic transform.

4. The flame temperature estimator of claim 1 wherein the combustion temperature trend module calculates the combustion temperature trend using cascaded filters.

5. The flame temperature estimator of claim 1 wherein the combustion temperature trend module calculates the combustion temperature trend further based on:

$$T_{comb\_tmp}(k) = T_{comb\_tmp}(k-1) + k_{filt1}*(T_{bulk}(k) - T_{comb\_tmp}(k-1)); \text{ and}$$

$$T_{comb}(k) = T_{comb}(k-1) + k_{filt2}*(T_{bulk\_tmp}(k) - T_{comb}(k-1))$$

where $k_{filt1}$ and $k_{filt2}$ are filter constants, $T_{comb\_tmp}(k_0)$ is an Adiabatic flame temperature at combustion time $k_0$, and $T_{comb}(k_0) = T_{bulk}(k_0)$ at combustion time $k_0$.

6. The flame temperature estimator of claim 1 further comprising a calibration module that calibrates a relationship between the temperature reduction and the air-to-fuel ratio.

7. The flame temperature estimator of claim 1 wherein the air-to-fuel ratio comprises a ratio of a current air-to-fuel ratio divided by a stoichiometric air-to-fuel ratio.

8. A nitrogen oxides (NOx) estimation system comprising the flame temperature estimator of claim 1, wherein the NOx estimation system calculates a NOx estimate based on at least one the adiabatic flame temperature, the temperature reduction, and the combustion temperature trend.

9. The NOx estimation system of claim 8, wherein the NOx estimate is generated independent of direct measurement of engine-out NOx levels.

10. A method for estimating a flame temperature, comprising:
    measuring an air-to-fuel ratio of an engine;
    estimating an adiabatic flame temperature;
    estimating a temperature reduction for the adiabatic flame temperature based on the air-to-fuel ratio of the engine; and
    generating a combustion temperature trend with respect to a crank angle of the engine based on the temperature reduction and the adiabatic flame temperature.

11. The method of claim 10 further comprising estimating the adiabatic flame temperature based on combustion chamber pressure and a bulk temperature.

12. The method of claim 10 further comprising calculating the combustion temperature trend using a polytropic transform.

13. The method of claim 10 further comprising calculating the combustion temperature trend further based on:

$$T_{comb\_tmp}(k) = T_{comb\_tmp}(k-1) + k_{filt1}*(T_{bulk}(k) - T_{comb\_tmp}(k-1)); \text{ and}$$

$$T_{comb}(k) = T_{comb}(k-1) + k_{filt2}*(T_{bulk\_tmp}(k) - T_{comb}(k-1))$$

where $k_{filt1}$ and $k_{filt2}$ are filter constants, $T_{comb\_tmp}(k_0)$ is an Adiabatic flame temperature at combustion time $k_0$, and $T_{comb}(k_0) = T_{bulk}(k_0)$ at combustion time $k_0$.

14. The method of claim 10 further comprising calibrating a relationship between the temperature reduction and the air-to-fuel ratio.

15. The method of claim 10 wherein the air-to-fuel ratio comprises a ratio of a current air-to-fuel ratio divided by a stoichiometric air-to-fuel ratio.

16. The method of claim 10 further comprising calculating a NOx estimate based on at least one of the adiabatic flame temperature, the temperature reduction, and the combustion temperature trend.

17. A method for estimating a flame temperature comprising;

measuring an air-to-fuel ratio of an engine;

estimating an adiabatic flame temperature;

estimating a temperature reduction for the adiabatic flame temperature based on an air-to-fuel ratio of an engine;

generating a combustion temperature trend based on the temperature reduction and the adiabatic flame temperature; and calculating the combustion temperature trend using cascaded filters.

* * * * *